United States Patent [19]

Chiba et al.

[11] Patent Number: 5,253,111
[45] Date of Patent: Oct. 12, 1993

[54] CEMENTED PLASTIC LENS

[75] Inventors: Toru Chiba; Athuro Sekiyama; Mitsuo Gacho, all of Tokyo, Japan

[73] Assignee: Asahi Kogaku Kogyo K.K., Tokyo, Japan

[21] Appl. No.: 781,903

[22] Filed: Oct. 24, 1991

[30] Foreign Application Priority Data

Nov. 2, 1990 [JP] Japan ................... 2-298503

[51] Int. Cl.$^5$ .............. G02B 25/00; G02B 3/00; G02C 7/02
[52] U.S. Cl. .................. 359/647; 351/159; 351/166; 359/642
[58] Field of Search ............ 351/159, 166, 172; 359/642, 647

[56] References Cited

U.S. PATENT DOCUMENTS 4,679,918  7/1987  Ace ................... 351/166 X

Primary Examiner—Scott J. Sugarman
Attorney, Agent, or Firm—Sughrue, Mion, Zinn, Macpeak & Seas

[57] ABSTRACT

A cemented plastic lens is formed of two plastic lenses made of dissimilar synthetic resin materials having different coefficients of thermal expansion. The lenses have mating surfaces that have macroscopically the same curvature, and the mating surfaces are bonded together with a soft adhesive that is capable of elastic deformation by itself in a hardened state and that has the ability to attenuate the stress that will develop at the cemented interface due to the thermal expansion mismatch.

9 Claims, 1 Drawing Sheet

CEMENTED PLASTIC LENS

BACKGROUND OF THE INVENTION

The present invention relates to a cemented plastic lens made of synthetic resin materials.

The use of plastic lenses as a substitute for glass lenses is gaining popularity today as a result of the recent improvement in plastics molding technology. Conventionally, plastic lenses have been used as single elements to take advantage of the optical properties of resin materials. However, this practice causes a problem in certain applications such as a where a plastic lens is used as binocular eyepiece; the eyepiece has a small diameter and its entrance face has a small radius of curvature, so that part of the incident rays will be totally reflected by the entrance face. In order to prevent such total reflection, the entrance face of a small curvature radius must be combined with another lens element to form a cemented lens. If one wants to compensate for chromatic aberration of the cemented plastic lens, the individual lens elements must have different optical properties, but then those elements will have different coefficients of thermal expansion.

For bonding two plastic lens elements, one may think of using adhesives that are conventionally employed in bonding glass lenses. In fact, however, the following problems have been found to occur if plastic lens elements having different coefficients of thermal expansion are bonded together by the technique commonly used in cementing glass lenses. First, plastic lenses are generally softer than glass lenses, so when two thin plastic lenses are bonded together with an adhesive, the adhesive will shrink upon hardening and an internal stress will develop in the lenses themselves to deform their shape. Secondly, if two thick plastic lenses are bonded together, not only their shape is deformed by the thermal expansion mismatch but the resulting deformation will also cause stress concentration at the interface between the cemented lens elements, which might lead to lens destruction in an extreme case.

Opthalmic lenses that are named "Combi" are also known as cemented plastic lenses. However, in such opthalmic lenses, two lens elements that are made of the same synthetic resin material but which have different curvatures (or aspheric surfaces) are bonded together in appropriate combinations. Hence, there will be no development of stress at the cemented interface due to thermal expansion mismatches, nor will there be the problem of stress development since the cemented interface has a large radius of curvature. In short, the opthalmic lens consists of cemented lens elements of the same material and, hence, is free from the aforementioned problems encountered with the cemented plastic lenses that are fabricated by bonding lens elements of dissimilar resin materials.

SUMMARY OF THE INVENTION

The present invention has been motivated by the discovery of the peculiar problem associated with cementing two plastic lens elements made of dissimilar materials and its object is to provide a cemented plastic lens that is substantially free not only from the deformation of cemented lens elements but also from the development of stress concentration at the cemented interface due to the difference between the coefficients of thermal expansion of the dissimilar synthetic resin materials of which those elements are made, and that, hence, will exhibit the intended optical performance.

This object of the present invention can be attained by a cemented plastic lens consisting of two plastic lens elements made of dissimilar synthetic resin materials having different coefficients of thermal expansion, the lens elements having mating surfaces that have macroscopically the same curvature, the mating surfaces being bonded together with a soft adhesive that is capable of elastic deformation by itself in a hardened state and that has the ability to attenuate the stress that will develop at the cemented interface due to the thermal expansion mismatch.

The present invention is particularly advantageous if it is applied to a cemented plastic lens that has an outside diameter of about 10-20 mm and in which the mating surfaces have a curvature radius of no more than 15 mm, namely in the case where the cemented interface of the lens has such a large curvature as to cause total reflection of part of the incident rays.

If desired, the mating surfaces of the two plastic lens elements may be adapted to have different curvature radii in such a way that when they are placed in contact with each other at the point where the optical axis passes, a microscopically small gap is formed in the peripheral portion of the lens. In this embodiment, the soft adhesive can be spread easily and evenly between the mating surfaces of the two plastic lens elements. With the curvature radii of those lens elements being set in the manner described above, the layer of the soft adhesive will become thicker in the peripheral portion of the lens than in the central portion, whereby it becomes possible to ensure that the adhesive will act more positively as a stress attenuator by its own elastic deformation.

Suitable examples of the soft adhesive that can be used in the present invention are those which have a Shore hardness of no more than D70, and preferably those which are softer than that with a Shore hardness of A40. The soft adhesive is hardened by polymerization and is subjected to polymerization shrink.

DETAILED DESCRIPTION OF THE INVENTION

Preferred embodiments of the present invention will be described with reference to the accompanying drawings.

Figure 1:
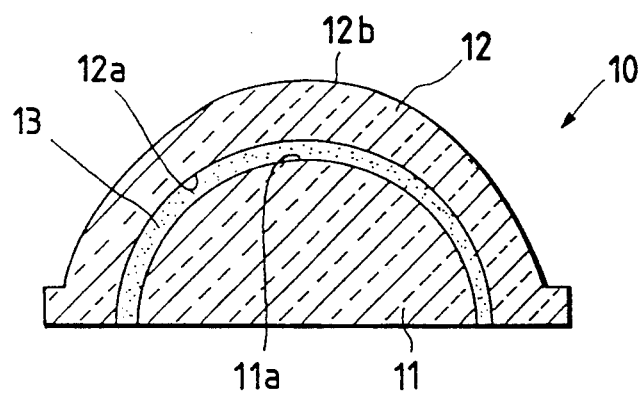
FIG. 1 is a cross section showing schematically the basic structure of the cemented plastic lens of the present invention.

FIG. 1 shows a cemented plastic lens 10 according to an embodiment of the present invention. The lens 10 consists of a convex lens element 11 that is bonded to a concave meniscus lens element 12 with a soft adhesive 13. The convex lens element 11 is made of a polycarbonate resin having a linear expansion coefficient of $7 \times 10^{-5}/°C$ and a refractive index of 1.59, whereas the concave meniscus lens element 12 is made of an acrylic resin having a linear expansion coefficient of $5 \times 10^{-5}/°C$ and a refractive index of 1.49. Each of the convex lens element 11 and the concave meniscus lens element 12 has a working outside diameter of 14 mm; their mating surfaces 11a and 12a have a curvature radius of 8.20 mm; and the convex surface 12b of the concave meniscus lens elements 12 has a curvature radius of 10.657 mm.

The soft adhesive 13 is "OP1080L" (the trade name of Denki Kagaku Kogyo K.K.) having a Shore hardness of A20.

Figure 2:
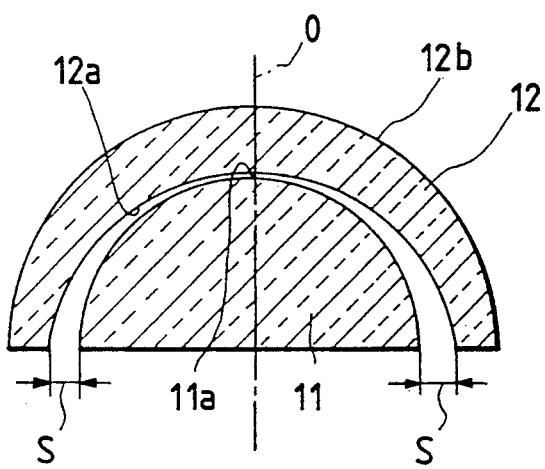
FIG. 2 is a cross section showing on an exaggerated scale a case for setting the radius of curvature of the mating surfaces of two lens elements to be bonded.

As shown exaggerated in FIG. 2, the mating surfaces 11a and 12a of the convex lens element 11 and the concave meniscus lens element 12, respectively, are preferably adapted to have such a radius of curvature that when the two lens elements are placed in contact with each other at the point where the optical axis "0" passes, a gap "s" will be formed in the peripheral portion of the cemented lens. If the curvature radius of the mating surfaces 11a and 12a is set at a value that satisfies the above-mentioned condition, the soft adhesive 13, when it is applied between the two lens elements, will flow from the center to the periphery, so that it spreads uniformly to cover the entire part of the space between the mating surfaces 11a and 12a. Allowing the soft adhesive 13 to cover every part of the mating surfaces, namely, insuring that there will be no air entrapped in the gap between the mating surfaces, is essential for the purpose of permiting the cemented lens to exhibit the intended optical performance.

Another consequence of setting the curvature radius of the mating surfaces 11a and 12a in the manner described above is that the layer of the soft adhesive 13 will become thicker in the peripheral portion of the cemented lens than in the central portion. The temperature-dependent change in the curvature radii of the convex lens element 11 and the concave meniscus lens element 12, is regarded such that the absolute amount of lens deformation will increase with the increasing distance from the optical axis 0; hence, the thicker layer of adhesive 13 in the peripheral portion of the lens offers the advantage that the lens deformation due to the change in curvature radius, that is, the lens deformation due to the change in temperature can be absorbed more effectively by the adhesive 13 which is capable of elastic deformation in a hardened state.

Satisfactory results can be obtained if the gap "s" is adjusted to lie between one micron and several hundred microns on the condition that the cemented plastic lens 10 is approximately of the size illustrated above.

The cemented plastic lens 10 made of dissimilar materials is necessary to prevent not only total reflection but also other unwanted phenomena such as chromatic aberration in the case where the mating surfaces 11a and 12a have a small radius of curvature as described above. Hence, the present invention will prove particularly effective if it is applied to the case where the convex lens element 11 and the concave meniscus lens element 12 have an outside diameter of about 10-20 mm while the mating surfaces 11a and 12a have a curvature radius of no more than 15 mm.

The effectiveness of the present invention will be described below more specifically on the basis of experimental results.

Experiment

Using the convex lens element 11 and concave meniscus lens element 12 that are shown in FIG. 1, ten samples (samples 1a-5a and samples 1b-5b) of cemented plastic lenses were fabricated. As for samples 1a-5a, the two lens elements were bonded together with the soft adhesive 13 that was commercially available under the above-mentioned trade name "OP1080L" from Denki Kagaku Kogyo K.K. The radius of curvature R of the convex surface 12b of the concave meniscus lens element 12 of samples 1a-5a was measured before and after the bonding and the results are shown in Table 1.

As for samples 1b-5b, the two lens elements were bonded together with "OP6040L" (the trade name of Denki Kagaku Kogyo K.K.) having a Shore hardness of D90. This was hard adhesive commonly used in bonding glass lenses. The radius of curvature R of the convex surface 12b of the concave meniscus lens element 12 of samples 1b-5b was also measured before and after the bonding and the results are shown in Table 2.

As is clear from Tables 1 and 2, samples 1a-5a (present invention) in which the convex lens element 11 was bonded to the concave meniscus lens element 12 with the soft adhesive 13 had the advantage that the changes in the curvature radius of the convex surface 12b that occurred as a result of bonding the two lens elements were on the order of one thousandth of a millimeter (1/1000 mm). However, in comparative samples 1b-5b in which the convex lens element 11 was bonded to the concave meniscus lens element 12 with the hard adhesive, the changes in the curvature radius of the convex surface 12b were on the order of one hundredth of a millimeter (1/100 mm). In other words, the changes in curvature radius that occurred when the hard adhesive was used were at least 10 times as great as the changes that occurred in the samples prepared in accordance with the present invention.

The above results may be explained as follows: although the soft adhesive 13 is subjected to polymerization shrink at the hardening thereof, the soft adhesive 13 is capable of elastic deformation in a hardened state, so it will not cause any adverse effects on the shape of either the convex lens element 11 or the concave meniscus lens element 12; on the other hand, the conventional hard adhesive, when it hardens and shrinks, will exert a stress on the two lens elements to thereby deform them.

The samples were also examined for any stress that would be develop both in the adhesive layer and at the interface between the adhesive layer and each plastic molding at two different temperatures (+50° C. and −20° C.). The examination was conducted with a polarizing plate. The results are also shown in Tables 1 and 2. As is clear from Table 2, the cemented lenses using the hard adhesive experienced considerable stress concentration, particularly in the low-temperature range. However, as is clear from Table 1, no stress concentration was observed in the cemented lenses that used the soft adhesive.

TABLE 1

| Sample No. | R before bonding (mm) | R after bonding (mm) | Stress concentration under examination with polarizing plate | |
|---|---|---|---|---|
| | | | +50° C. | −20° C. |
| 1a | 10.659 | 0.655 | No stress concentration was observed. | |
| 2a | 10.658 | 10.653 | | |
| 3a | 10.657 | 10.654 | | |
| 4a | 10.659 | 10.653 | | |
| 5a | 10.658 | 10.655 | | |

TABLE 2

| Sample No. | R before bonding (mm) | R after bonding (mm) | Stress concentration under examination with polarizing plate | |
|---|---|---|---|---|
| | | | +50° C. | −20° C. |
| 1b | 10.655 | 10.643 | Stress | Extensive |

TABLE 2-continued

| Sample No. | R before bonding (mm) | R after bonding (mm) | Stress concentration under examination with polarizing plate | |
|---|---|---|---|---|
| | | | +50° C. | −20° C. |
| 2b | 10.657 | 10.644 | concentration was observed | stress concentration was observed |
| 3b | 10.658 | 10.642 | | |
| 4b | 10.658 | 10.644 | | |
| 5b | 10.657 | 10.644 | | |

As described above, in the cemented plastic lens of the present invention which is made of two lens elements that are made of dissimilar synthetic resin materials, a soft adhesive that is capable of elastic deformation by itself in a hardened state and that has the ability to attenuate the stress that will develop at the cemented interface due partly to the thermal expansion mismatch between the dissimilar synthetic resin materials and partly to the shrinkage of the hardened adhesive is provided between the curved mating surfaces of the two lens elements. Because of this arrangement, the deformation of the cemented plastic lens that would otherwise occur on account of either the shrinkage of the hardened adhesive or temperature changes is effectively prevented to ensure that no destructive stress will be concentrated at the cemented interface of the lens.

Although, in the above description, the soft adhesive was used for bonding two plastic lenses made of different resin materials, the present invention is also effective for a case where the soft adhesive is used for bonding two plastic lenses made of the same kind of resin materials, since the soft adhesive attenuates the inner stress due to polymerization shrink of the soft adhesive by elastic deformation of the soft adhesive itself.

The present disclosure relates to subject matter contained in Japanese Patent Application No. Hei. 2-298503 filed on Nov. 2, 1990 which is expressly incorporated herein by reference in its entirety.

What is claimed is:

1. A cemented plastic lens, comprising:
   a first plastic lens made of first synthetic resin material;
   a second plastic lens made of second synthetic resin material being different from said first resin material and having coefficient of thermal expansion different from that of said first resin material, said first and second lenses having mating surfaces that have macroscopically the same curvature; and
   a soft adhesive, said mating surfaces being bonded together with said soft adhesive that is capable of elastic deformation by itself in a hardened state and that has the ability to attenuate the stress that will develop at said mating surfaces due to the thermal expansion mismatch.

2. A cemented plastic lens according to claim 1, wherein said mating surfaces have a curvature radius of no more than 15 mm when said first and second lenses have an outside diameter of 10-20 mm.

3. A cemented plastic lens according to claim 1, wherein said mating surfaces of said first and second lenses are adapted to have different curvature radii in such a way that when they are placed in contact with each other at a point where an optical axis passes, a microscopically small gap forms in peripheral portions of said first and second lenses.

4. A cemented plastic lens according to claim 1, wherein said soft adhesive has a Shore hardness of no more than D70.

5. A cemented plastic lens according to claim 1, wherein one of said first and second lenses is a convex lens and the other of said first and second lenses is a concave meniscus lens.

6. A cemented plastic lens according to claim 2, wherein one of said first and second lenses is a convex lens and the other of said first and second lenses is a concave meniscus lens.

7. A cemented plastic lens, comprising:
   a first plastic lens made of first synthetic resin material;
   a second plastic lens made of second synthetic resin material being different from said first resin material, said first and second lenses having mating surfaces that have macroscopically the same curvature; and
   means for bonding said first and second plastic lenses and for attenuating the stress that will develop at said mating surfaces due to the thermal expansion mismatch by elastic deformation of said bonding means itself.

8. A cemented plastic lens, comprising:
   a first plastic lens made of first synthetic resin material;
   a second plastic lens made of second synthetic resin material being different from said first resin material, said first and second lenses having mating surfaces that have macroscopically the same curvature; and
   means for bonding said first plastic lens and said second plastic lens, said bonding means being hardened by polymerization and elastically deformed to attenuate the inner stress that will develop in the cemented lens itself due to the polymerization shrink of said bonding means.

9. A cemented plastic lens, comprising:
   a first plastic lens;
   a second plastic lens;
   means for bonding said first and second plastic lenses, said bonding means being hardened by polymerization and elastically deformed to attenuate the inner stress that will develop in the cemented lens itself due to the polymerization shrink of said bonding means.

* * * * *